C. C. DEUEL.
ROTARY ENGINE.
APPLICATION FILED JAN. 3, 1918.

1,317,909.

Patented Oct. 7, 1919.
3 SHEETS—SHEET 1.

WITNESS:
R. Hamilton

INVENTOR.
Clyde C. Deuel
BY Warren D. House
His ATTORNEY

C. C. DEUEL.
ROTARY ENGINE.
APPLICATION FILED JAN. 3, 1918.

1,317,909.

Patented Oct. 7, 1919.
3 SHEETS—SHEET 2.

WITNESS:
R. E. Hamilton

INVENTOR.
Clyde C. Deuel
BY Warren D. House,
His ATTORNEY

C. C. DEUEL.
ROTARY ENGINE.
APPLICATION FILED JAN. 3, 1918.
1,317,909.
Patented Oct. 7, 1919.
3 SHEETS—SHEET 3.
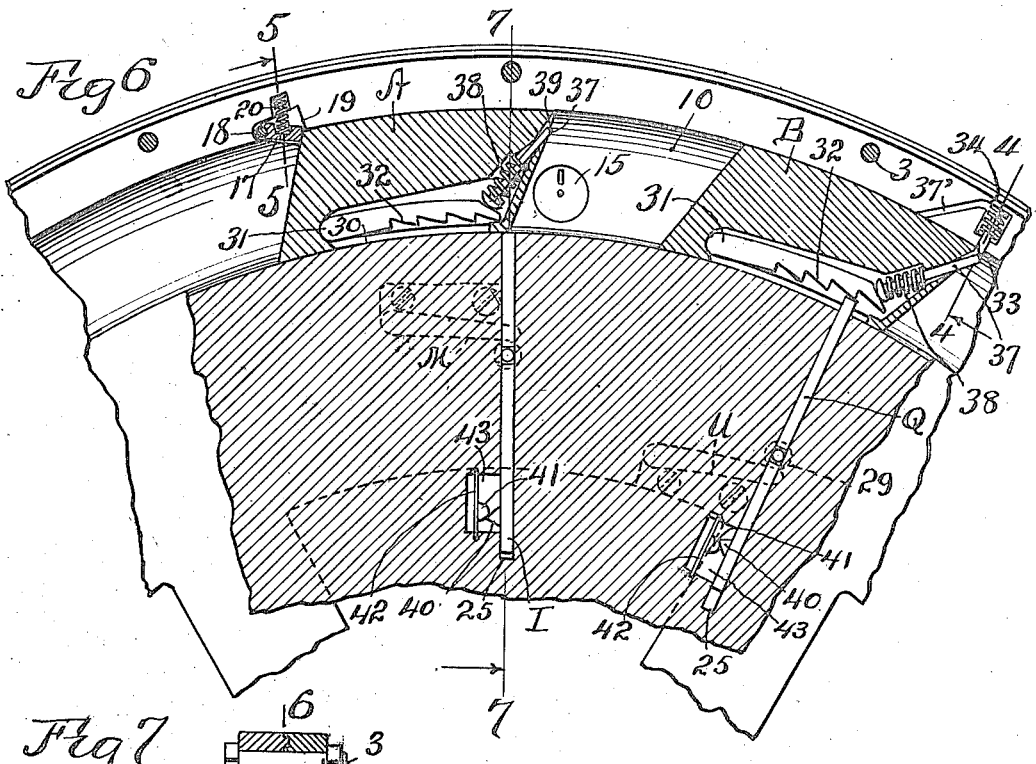
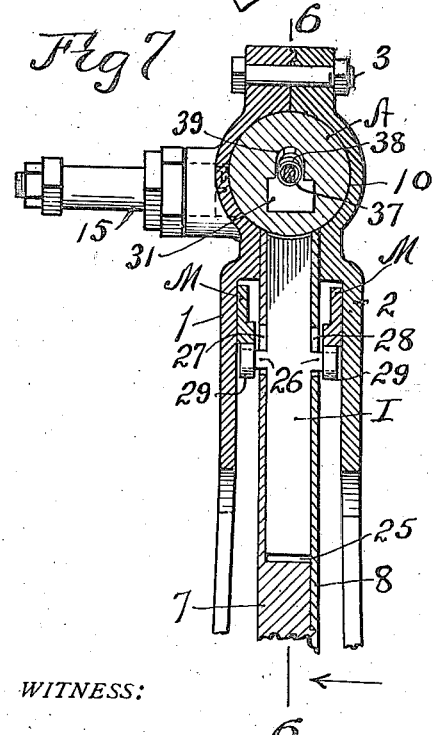
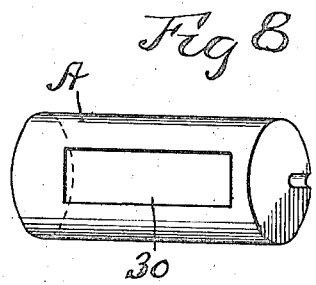

UNITED STATES PATENT OFFICE.

CLYDE C. DEUEL, OF KANSAS CITY, MISSOURI.

ROTARY ENGINE.

1,317,909.      Specification of Letters Patent.      Patented Oct. 7, 1919.

Application filed January 3, 1918. Serial No. 210,206.

*To all whom it may concern:*

Be it known that I, CLYDE C. DEUEL, a citizen of the United States, residing at Kansas City, in the county of Jackson and State of Missouri, have invented a certain new and useful Improvement in Rotary Engines, of which the following is a specification.

My invention relates to improvements in rotary engines.

While relating particularly to rotary engines of the explosive type, my invention is adapted for use in connection with rotary engines which employ compressed air, steam, water or other fluid for a motive power.

One of the objects of my invention is to provide a rotary engine of novel construction, which is capable of high speed, and which for its weight possesses a maximum of efficiency.

A further object of my invention is to provide an explosive engine in which the exhaust is closed to atmospheric pressure, thereby eliminating to a large extent noise from the explosions, so that the engine in running will be practically noiseless.

Another novel feature of my invention resides in the fact that the piston travel in the exploding of a charge is much longer than the piston travel on the intake and compression of a charge, thereby effecting greater efficiency and an exhaust at lower pressure than is obtainable with engines in which the piston travel is the same during the compression and exploding of a charge, as in engines of the reciprocating type.

Other novel features of my invention are hereinafter fully described and claimed.

In the accompanying drawings, which illustrate the preferred embodiment of my invention, Figure 1 is a side elevation of my improved engine, partly broken away, with one side of the casing removed, and some of the parts shown in cross section.

Fig. 6 is an enlarged fragmental vertical sectional view of a portion of the engine, showing the positions of two of the pistons at the time an explosion takes place between them.

Fig. 7 is a vertical sectional view on the line 7—7 of Fig. 6.

Fig. 8 is an enlarged perspective view of one of the pistons with the latch and spring actuated pin removed therefrom.

Similar reference characters designate similar parts in the different views.

Figure 1:
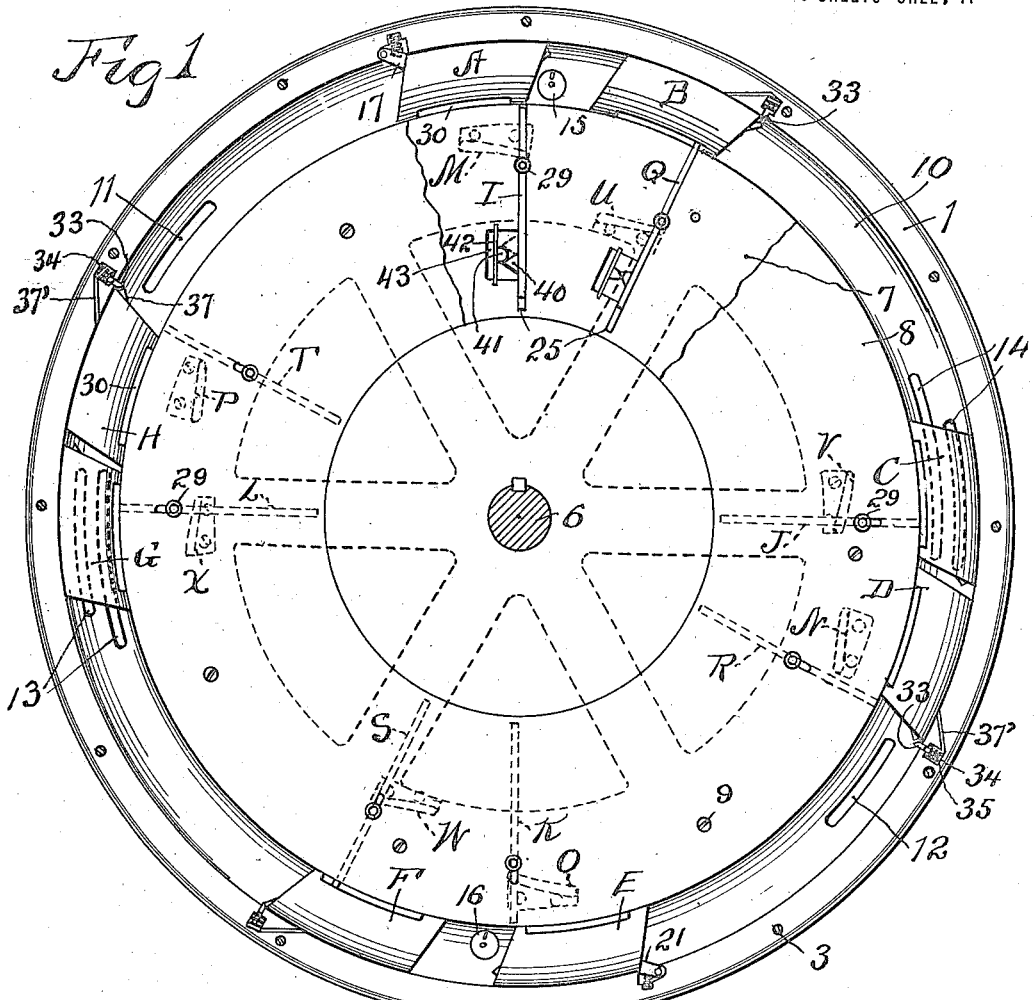
Figure 2:
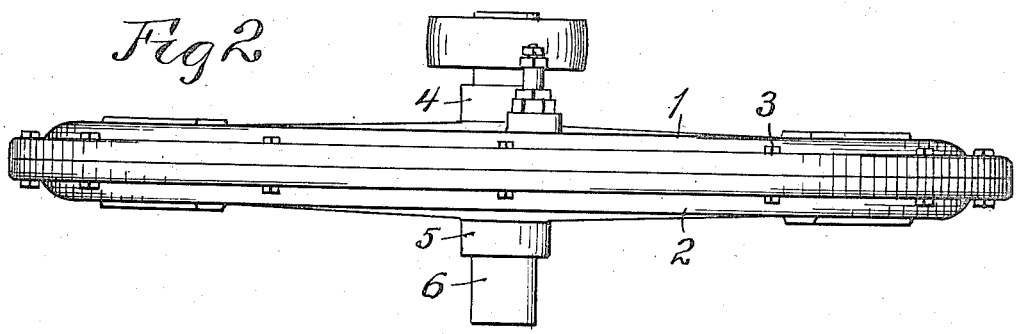
Fig. 2 is a top view of the engine.

The engine is provided with a stationary member comprising a casing consisting of two side plates 1 and 2, which are similar in construction and which are secured together by bolts 3.

Centrally and rotatably mounted on bearings 4 and 5 with which the plates 1 and 2 are respectively provided, is a horizontal shaft 6 having keyed to it a rotary member, which is rotatably fitted between the plates 1 and 2 and which comprises a circular plate 7, to one side of which is secured by screws 9, a ring plate 8 disposed concentrically to the shaft 6 and plate 7. The plates 1 and 2 and the rotary member comprising the plates 7 and 8 have between them an annular passage 10, disposed, preferably, at the periphery of the rotary member, and concentric with the axis thereof.

The passage 10 is preferably circular in cross section and has mounted in it a plurality of arcuate pistons A, B, C, D, E, F, G, and H, adapted for travel in the passage 10, independently of the rotary member and the casing or stationary member. These pistons are alike, so that a description of one will suffice for all.

Each piston is circular in cross section and is closely and slidably fitted in the passage 10.

Means are provided by which each of the pistons is enabled to alternately engage the casing and the rotary member, so as to serve as an abutment and for propelling the rotary member.

The casing plate 1 is provided with duplicate intake ports 11 and 12, through which charges are simultaneously admitted to the passage 10.

Figure 5:
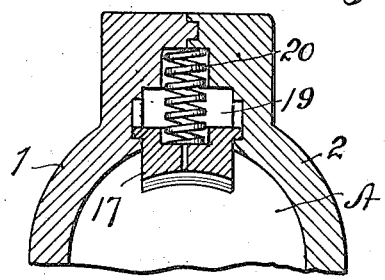
Fig. 5 is an enlarged sectional view on the line 5—5 of Fig. 6.

The plate 1 is also provided with duplicate pairs of exhaust ports 13 and 14. Intermediate of the ports 11 and 14 is a spark plug 15, disposed so as to discharge a spark in the passage 10. A similar spark plug 16 is similarly located between the ports 12 and 13. Intermediate of the spark plug 15 and the port 11 is a latch 17, Fig. 5, which is pivoted on a transverse pin 18 in a recess 19 provided in the plates 1 and 2 and which communicates with the passage 10. A coil spring 20 normally forces the latch 17 into the operative position shown in the drawings, in which position it affords a means for holding the piston consecutively from rearward movement in the passage 10, whereby the pistons may serve as abutments for receiving at their forward ends the force of charges exploded by the spark plug 15.

Diametrically opposite to the latch 17 is a similar latch 21, which is pivoted by a transverse pin 22 to the plates 1 and 2. The latch 21 is located in a recess 23 which communicates with the passage 10. A coil spring 24 normally serves to force the latch 21 into the passage 10 so that the latch may hold the pistons from rearward movement.

Figure 3:
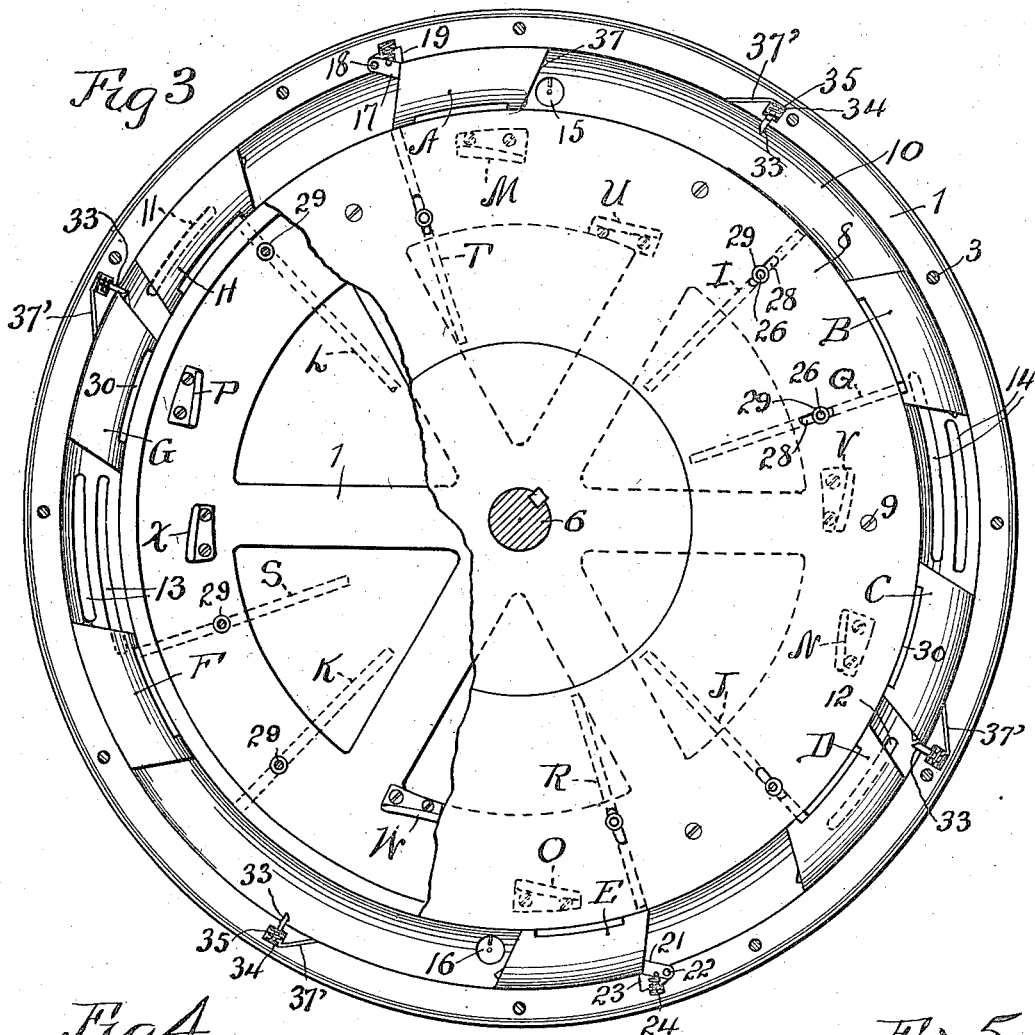
Fig. 3 is a view similar to Fig. 1, showing other positions of the movable parts.

In order that each of the pistons A, B, C, D, E, F, G, and H may be forced in a clockwise direction, as viewed in Figs. 1, 3 and 6, past the intake ports 11 and 12, to the positions shown in Figs. 1 and 3, by the pistons A and E, so as to introduce and compress explosive charges in the passage 10, there are provided four radially movable interlocking members I, J, K and L, which are respectively slidably mounted in radial grooves 25, which are provided in the plate 7 of the rotary member.

As shown in Fig. 7, the interlocking member I is provided, as is each of the members J, K and L, with two oppositely laterally extending arms 26, which extend through and are respectively slidable in slots 27 and 28 in the plates 7 and 8.

Rotatably mounted on the arms 26 respectively are rollers 29, which are adapted to consecutively engage pairs of curved inclined cams M, N, O and P, the cams of each pair being secured directly opposite to each other to the inner sides respectively of the plates 1 and 2.

The surfaces of the cams P and N which are engaged by the rollers 29, incline outwardly, so as to force the interlocking members outwardly into operative engagement with the pistons. In order that the pistons may be forced forwardly by the interlocking member, each piston is provided on its inner side with a slot 30 which is adapted to receive any one of the interlocking members, see Figs. 6 and 8.

When the rotary member revolves, the interlocking members I, J, K or L, as the case may be, engage the two pistons which are at the rear of the ports 11 and 12 and force these pistons to the positions occupied by the pistons A and E in Fig. 1. After the pistons have been respectively engaged by the latches 17 and 21, the rollers 29 of the interlocking members which are engaged with the pistons are moved radially inwardly by the cams M and O, thereby disengaging the said interlocking members, as for example the members I and K, from the pistons A and E.

At this time, two charges which have been compressed between the pistons A and B and E and F will be exploded by the spark plugs 15 and 16, the force of which explosions will be against the forward ends of the pistons A and E and against the rear ends of the pistons B and F, which will be propelled forwardly by the exploded charges in the passage 10.

In order that the pistons when forced forwardly by the exploded charges shall again interlock and be operatively connected with the rotary member comprising the plates 7 and 8, there are provided four interlocking members Q, R, S and T, similar in construction to the interlocking members I, J, K and L and similarly provided with rollers 29 which are adapted to consecutively engage the inclined curved surfaces of four pairs of cams U, V, W and X. The cams U and W are inclined forwardly and outwardly, so that when the rollers 29 of the members Q, R, S and T engage them, said members will be forced outwardly, into the slots 30 of the adjacent pistons, as the pistons B and F. Each piston has mounted in its slot 30 a latch comprising a bar 31 pivotally mounted at its rear end and having ratchet teeth 32 on its inner side adapted to be engaged by any one of the interlocking members entering therein.

When the latch bars 31 engage the interlocking members, as for example, the members Q and S, and the charges have been exploded at the rear of the two pistons which occupy the positions of the pistons B and F in Fig. 1, said pistons on being forced ahead will, through the intermediacy of the latch bars 31 and interlocking bars Q and S, forwardly propel the rotary member comprising the plates 7 and 8, and the preceding exploding charges will be forced by said pistons B and F through the exhaust ports 14 and 13.

Figure 4:
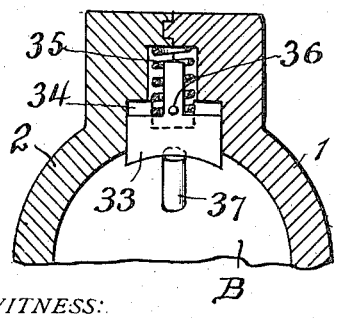
Fig. 4 is an enlarged sectional view on the line 4—4 of Fig. 6.

For holding the pistons B and F in the positions occupied by the pistons B and F in Fig. 1, there are provided two diametrically opposite catches, one of which is shown in Fig. 4, and each consisting in a radially movable catch bar 33 slidably mounted in a recess 34 provided in the members 1 and 2 and communicating at its inner end with the passage 10. A coil spring 35 normally forces the inner end of the catch bar 33 into the passage 10 in the path of the pistons A to H. A transverse pin 36 in the bar 33 serves to limit the inward movement of the bar. A passage 37' communicating with the recess 34 and with the passage 10 at the rear of the recess 34, serves to equalize the fluid pressure at the inner and outer ends of the bar 33.

For releasing the pistons from the catch bars 33 after the interlocking members have engaged with the latch bars 31, and simultaneously, preferably, with the exploding of the charges, each piston A to H has slidably mounted in it in an outwardly and forwardly inclined hole, a pin 37, the lower end of which is held by a coil spring 38 against the outer side and forward end of the adjacent latch bar 31. The said inclined hole, designated by 39, extends through the forward end of the piston, as does the pin 37.

When the latch bar 31 is swung outwardly by one of the interlocking bars, its outer end will engage the beveled rear side of the lower portion of the adjacent catch bar 33, and the latter will be forced outwardly to the position shown in Figs. 1 and 6, in which position the beveled edge of the catch bar 33 will be engaged by the forward end of the adjacent piston, thereby releasing the piston, which at the same time is propelled forwardly by the exploding charge behind it. Thus, as shown in Fig. 6, when the interlocking member Q is forced by the cam U into engagement with the latch bar 31, the latter forces outwardly the pin 37, which in turn forces outwardly the catch bar 33 adjacent thereto, so that the piston B will strike the beveled rear side of the catch bar, and the piston B will be forced forwardly by the exploding charge behind it. At this time the tooth 32 of the latch bar which is engaged by the interlocking bar Q will force the latter together with the rotary member forwardly.

To release the pistons from the interlocking bars Q, R, S and T when they are in the positions occupied by the pistons C and G, in Fig. 1, in which positions the said pistons have passed partly over the exhaust ports 14 and 13, there are provided on the inner sides of the plates 1 and 2, two pairs of forwardly and inwardly inclined curved cams V and X, which have their inner sides engage the rollers 29 of said interlocking bars Q to T, thereby drawing inwardly the interlocking bars which are at the time engaged with the pistons occupying the positions of the pistons C and G in Fig. 1.

The piston, as for example, the piston B, which is engaged by the interlocking member Q, Fig. 3, passes over the exhaust ports 14, the rollers 29 will engage the inner side of the cam V, upon which the interlocking member Q will be withdrawn from engagement with the latch bar 31 of the piston B, leaving the piston in the position shown in Fig. 1 as being occupied by the piston C.

In like manner, the piston F will have moved with the interlocking member S to the position occupied by the piston G in Fig. 1.

In the position shown in Fig. 1, the piston occupying the position of the piston G will have been freed from the interlocking member which it has been propelling by the cam X. The pistons, therefore, occupying the positions of the pistons C and G, Fig. 1, will be "floating" pistons adapted for travel in the passage 10 independently of the rotary member or of the casing.

For stopping the pistons at points intermediate of the exhaust ports 14 and the intake port 12, and between the exhaust ports 13 and the intake port 11, in the positions occupied by the pistons C and G in Fig. 3, and D and H in Fig. 1, there are provided just at the rear of the intake ports 12 and 11, two diametrically opposite catch bars 33, similar to the catch bars 33 already described and similarly located in recesses 34, having mounted in them, coil springs 35 which normally force the catch bars 33 inwardly into the path of the pistons.

The pistons occupying the positions of the pistons C and G in Fig. 3, are held from forward movement by the catch bars 33 which are immediately in front of them, and serve to separate the exhaust ports 14 and 13 from the intake ports 12 and 11 respectively. The pistons immediately forward of the pistons C and G can, in moving forwardly from the positions occupied by the pistons D and H to the positions occupied by the pistons A and E, in Fig. 3, create partial vacuums behind them and forward of the pistons C and G, so as to suck in charges through the intake ports 12 and 11.

After the pistons D and H, Fig. 3, have drawn charges into the passage 10, and have moved to the positions occupied by the pistons A and E, Fig. 3, the interlocking members I and K, Fig. 3, in traveling forward with the rotary member, will have their rollers 29 engage the cams N and P, thereby forcing said interlocking members into the slots 30 of the pistons C and G and into engagement with the latch bars 31 of the pistons C and G. At the same time, the latch bars 31 will force outwardly the pins 37 which are engaged thereby, and the pins 37 will force outwardly the adjacent catch pins 33, thereby releasing the pistons C and G from their holding catch bars 33, upon which the interlocking members I and K will engage the pistons C and G at the forward ends of the slots 30, and will move said pistons forwardly across the intakes 12 and 11 and to the positions occupied by the pistons A and E in Figs. 1 and 3, at which time the cams M and O will engage the rollers 29 of the interlocking members K and I, thereby releasing them from the pistons with which they are then engaged.

It will be noted that when two pistons are occupying the positions of the pistons C and G in Fig. 1, they will have covered the forward ends of the exhaust ports 14 and 13, and there will be small spaces between them and the temporarily stationary pistons D and H, Fig. 1, which spaces will be occupied by small portions of exhaust gas, which will serve as cushions, which will slow down the speed of the pistons C and G, so that they will not strike the pistons D and H, and will prevent the floating pistons C and G, which are propelled forwardly, by the exhaust gas pressure behind them, from striking the adjacent catch bars 33 hard, when the pistons D and H are released therefrom and are replaced by the pistons C and G, Fig. 1.

For preventing the interlocking members I, J, K and L and Q, R, S and T from being moved accidentally radially in either direction, each of these members is provided at one side, with a wedge 40, Figs. 1 and 6, which is engaged alternately on its inner and outer sides by a button 41, which is mounted on a radial spring 42, which extends radially across a recess 43 and has its ends supported by the plate 7. The end of the button 41 which is engaged by the wedge 40 is rounded so that the wedge 40 can be forced inwardly and outwardly to the two positions shown in Fig. 6, when the rollers 29 are engaged by the cams M and U.

I will now describe the operation of the engine, tracing the movement of one of the pistons during a half revolution of said piston, in which time a charge admitted through the intake 11 will be compressed, exploded and exhausted, and the piston H will have traveled from the position shown in Fig. 1 to the position occupied by the piston D in Fig. 1, or the piston C in Fig. 3.

Referring first to Fig. 1, and assuming that a charge has been sucked into the passage 10 through the intake 11 by the piston A, the rotary member in its forward movement in a clockwise direction will carry the interlocking member L so that its rollers 29 will engage the cam P, upon which the member L will enter the slot 30 of the piston H and will force outwardly the latch bar 31 of said piston, thereby releasing the piston from the catch bar 33 through the intermediacy of the pin 37 of the piston H.

The member L will then engage the piston H and carry it forwardly to the position shown in Fig. 3, at which time the charge admitted through the intake 11 is being compressed between the pistons H and A, the latter piston being held against the latch 17 by the pressure of the exploded charge bearing against its forward end.

The continued forward movement of the rotary member and the interlocking member L will carry the piston H past the latch 17 and to the position occupied by the piston A in Figs. 1 and 3. At this time, the cams M will have released the piston H from engagement with the interlocking member L.

In the meantime, the piston B will have moved forwardly from the position shown in Fig. 1 to the position shown in Fig. 3, and the piston A will have moved to the position occupied by the piston B in Fig. 1. As the piston H moves to the position of the piston A in Fig. 1, it will draw a charge behind it into the passage 10 through the intake 11, and the charge ahead of the piston H will be exploded by the spark plug 15. The piston A at this time will be released from the catch bar 33, and the piston H will be moved forwardly against said catch bar by the pressure of the charge which is being compressed against its rear end by the piston G. When the latter piston has engaged the latch 17, the rotary member which has been propelled by the piston A will have turned to a position in which the interlocking member S will have its rollers 29 engage the outer side of the cams U, thus forcing the member S into engagement with the latch bar 31 of the piston H, which at this time is occupying the position of the piston B in Fig. 1. At the same time, the charge which has been compressed at the rear of the piston H will be exploded by the spark plug 15 and the piston H will be released from the catch bar 33, which at the time is holding it. The exploding charge will force forwardly the piston H, which being engaged with the member S will carry the rotary member forwardly until the member S engages the cams V, at which time the piston H will be in the position of the piston C in Fig. 1. In passing to this position, the piston H will have forced the exhaust gas in front of it out of the ports 14.

The now free or floating piston H will, upon the release of the following piston G from the catch 33, be forced forwardly by gas pressure at its rear end to the position occupied by the piston D in Fig. 1 and the piston C in Fig. 3, in which position it will be held from forward movement by the catch bar 33 adjacent to its forward end. From this last named position, the piston H will be carried forwardly by the interlocking member J which will be forced by the cams N into engagement with the piston H, following which the operation just described will be repeated during the other half of the revolution of the piston H.

It will be noted that the ends of each of the pistons A to H are inclined outwardly and forwardly with relation to the radius of revolution. Preferably this inclination is perpendicular to a tangent to the periphery of the rotary member which intersects the end of the piston to which it is perpendicular at approximately the center of said end. By means of this construction, the pressure against the rear end of each piston is in a direction such that the exploding charges at the rear ends of the pistons will force the latter against the rotary member and not against the casing.

In a corresponding manner, the back pressure exerted against the forward end of each piston will force the latter against the casing and not against the rotary member.

By this arrangement, when the piston is engaged with the rotary member, for propelling the same, the exploding charges hold the piston against the rotary member, thus reducing friction between the piston and the casing, while the piston is held by the exploding charges in front of it against the casing, when the piston is serving as an abutment and is bearing against the latches 17 or 21, thereby reducing friction between the piston and the rotary member when the piston is standing still.

It will be noted further that in the construction shown, the piston travel in the exploding of a charge is much longer than the piston travel on the intake and compression of a charge. By means of this construction, the combustion is more perfect and the exhaust is at a lower pressure than would be the case if the piston travel during compression and exploding of the charge was the same. This difference in the piston travel increases the efficiency and reduces the noise of the explosion.

While I have described the driving shaft 6 as being disposed horizontally, the position of the engine may be such that this shaft will be vertical.

I do not limit my invention to the structure shown and described, as various modifications, within the scope of the appended claims, may be made without departing from the spirit of my invention.

What I claim is:—

1. In an explosive engine, two members, one rotatable relatively to the other, having between them an annular passage, pistons adapted for travel in said passage independently of said members, two holding means carried by one of said members for holding the pistons from forward movement at two points, means intermediate of said holding means for holding the pistons from rearward movement, interlocking means carried by the other member for operatively engaging the pistons with said other member, means actuated by the interlocking means for releasing the pistons from the first named holding means, means for moving the interlocking means into and out of engagement with said pistons, the passage having a charge intake between the first named holding means and at one side of the intermediate holding means and charge igniting means at the other side of said intermediate holding means and between the two first named holding means.

2. In a rotary engine, two members, one rotatable relatively to the other, having an annular passage between them, a piston adapted for travel in said passage independently of said members, a latch carried by said piston, an interlocking member carried by said rotary member and adapted to operatively engage said latch so as to be propelled thereby, and adapted to engage the piston for propelling the latter, and means for moving the interlocking member into and out of engagement with said piston and latch.

3. In a rotary engine, two members, one rotatable relatively to the other, having an annular passage between them, a piston adapted for travel in said passage independently of said members, a catch for holding the piston from forward movement, an interlocking member carried by the rotary member and adapted to engage the piston for moving the latter forwardly, means carried by the piston for engaging and propelling said interlocking member, and means actuated by said last named means for releasing the piston from said catch.

4. In an explosive engine, two members, one adapted for rotation relatively to the other, having an annular passage between them provided with means for the intake and exhaust of charges, pistons adapted for travel in said passage independently of said members, and for compressing charges, means for exploding charges between the pistons, and means by which each piston alternately operatively engages said members, the arrangement of the parts being such that the travel of each piston during the exploding of a charge is longer than during compression.

In testimony whereof I have signed my name to this specification.

CLYDE C. DEUEL.